United States Patent
Gaylord

(10) Patent No.: US 6,882,361 B1
(45) Date of Patent: Apr. 19, 2005

(54) IMAGER LINKED WITH IMAGE PROCESSING STATION

(75) Inventor: Jeremy B. Gaylord, Portland, OR (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

(21) Appl. No.: 09/552,997

(22) Filed: Apr. 19, 2000

(51) Int. Cl.⁷ .......................... H04N 5/225; H04N 3/14; H04N 5/335; H04N 7/12
(52) U.S. Cl. ................ 348/207.1; 348/296; 375/240.01
(58) Field of Search ................ 348/296–299, 348/405, 207.1, 207.99, 552, 14.08–14.12, 222.1; 375/240.01–240.29; 725/95; 382/232–235; 370/468, 280; 345/420

(56) References Cited

U.S. PATENT DOCUMENTS

| | | | | |
|---|---|---|---|---|
| 5,640,202 A | * | 6/1997 | Kondo et al. | 348/222.1 |
| 5,739,562 A | * | 4/1998 | Ackland et al. | 257/291 |
| 5,822,625 A | * | 10/1998 | Leidig et al. | 396/77 |
| 6,108,447 A | * | 8/2000 | Lord et al. | 382/232 |
| 6,118,817 A | * | 9/2000 | Wang | 375/240.03 |
| 6,256,350 B1 | * | 7/2001 | Bishay et al. | 375/240.21 |
| 6,404,776 B1 | * | 6/2002 | Voois et al. | 370/468 |
| 6,526,097 B1 | * | 2/2003 | Sethuraman et al. | 375/240.2 |

OTHER PUBLICATIONS

Ray Fagliano, E–mail entitled *FW: Compaq CTO/Intel Create &Share Camera Pack, 4/21, 11:30 am (PST), 1:30pm (CST)*, Dated: Tuesday, Apr. 20, 1999, 5:25 PM, 3 pages.

* cited by examiner

*Primary Examiner*—Aung Moe
*Assistant Examiner*—Kelly L. Jerabek
(74) *Attorney, Agent, or Firm*—Marger Johnson & McCollom

(57) ABSTRACT

A digital video camera is coupled with an image processing station by a tether that has a bandwidth. The processing station has a memory with a program that executes instructions. When application software on the station requests a driver on the station to operate the camera at a specific frame rate, the program determines whether the requested frame rate is higher than permitted by the tether bandwidth. If that is so, the program computes a maximum permitted frame rate and an integration time of the pixels of the camera. The integration time causes the camera to produce output video frames at a rate commensurate with the computed bandwidth constrained frame rate, instead of the requested frame rate. The program then adjusts the gain accordingly.

15 Claims, 2 Drawing Sheets

200

- 210 DETERMINE A FRAME SIZE OF THE DIGITAL VIDEO CAMERA
- 220 DETERMINE A COMPRESSION RATIO OF THE DIGITAL VIDEO CAMERA
- 230 DETERMINE A BANDWIDTH OF A COMMUNICATION LINK
- 240 COMPUTE A BANDWIDTH CONSTRAINED FRAME RATE AS A FUNCTION OF THE DETERMINED BANDWIDTH, FRAME SIZE AND COMPRESSION RATIO
- 250 INPUT REQUESTED FRAME RATE
- 260 REQUESTED FRAME RATE >? THE BANDWIDTH CONSTRAINED FRAME RATE

YES

- 270 INTEGRATION TIME THRESHOLD = 1/(BANDWIDTH CONSTRAINED FRAME RATE)
- 280 INTEGRATION TIME >= INTEGRATION TIME THRESHOLD
- 290 DETERMINE UPDATED GAIN VALUE FROM THE INTEGRATION TIME

Fig. 2

IMAGER LINKED WITH IMAGE PROCESSING STATION

BACKGROUND

1. Field

This disclosure is related to the field of imaging.

2. Background of the Invention

When a digital video camera is aimed at a scene, it generates image data corresponding to the scene. The image data is then processed to produce an image of the scene.

An effort is made to improve the quality of the eventual image. The effort is made by adjusting some of the operating parameters of the digital video camera. Some adjustments are made by the user, and some automatically by the camera.

These operating parameters may include the pixel integration time, the gain, and the frame rate. The camera exposure parameters are the integration time and the gain. These parameters may be interrelated. For example, the integration time is currently determined, at least in part, by the luminance of the scene. If a scene starts becoming darker, the camera might correct for it by increasing the integration time.

There are a number of criteria used to determine video image quality. One criterion is the video frame rate (the higher the frame rate, the higher the quality). Another criterion is noise. The lower the noise, the higher the image quality. The noise is quantified as a Signal to Noise Ratio (SNR) (the lower the noise, the higher the SNR).

Often these two criteria are at odds. A higher frame rate requires a shorter integration time (and thus also a higher gain), which results in more noise (lower SNR). Achieving a higher SNR often requires a longer integration time, which in turn lowers the frame rate (and also requires lower gain).

In some situations, an image processing station is tethered to, and made to operate with, the digital video camera. The camera generates and simultaneously transfers the image data to the image processing station over the tether, which can be a data cable. This is referred to as a linked digital video camera.

Additional parameters may be adjusted in the situation where a digital video camera is linked. Some of these additional parameters are typically controlled by special software residing in the image processing station, sometimes called the camera client. One of these parameters is the frame rate of the image data flowing through the communication link. In many instances, the frame rate is not controlled directly, but only indirectly.

Sometimes the camera client requests the camera to transmit data at a specific frame rate. A digital video camera will attempt to deliver the frame rate requested by the camera client. Sometimes the requested frame rate is faster than can be accommodated by the bandwidth of the communication link. The requested frame rate will consequently not be provided.

The invention will become more readily apparent from the following Detailed Description, which proceeds with reference to the drawings, in which:

BRIEF DESCRIPTION OF THE DRAWINGS

FIG. 2 is a flowchart illustrating an embodiment of a method according to the invention.

DETAILED DESCRIPTION

Figure 1:
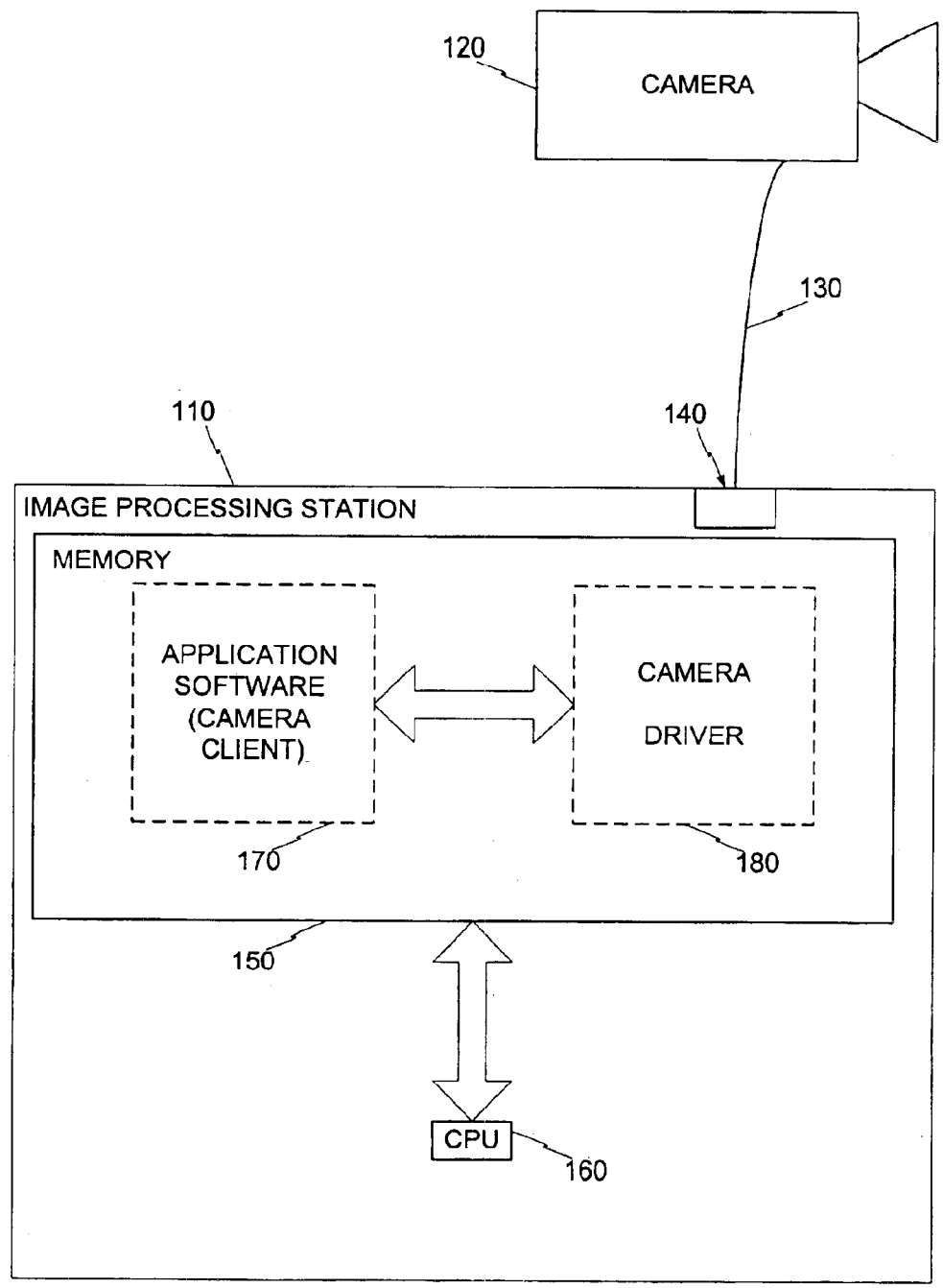
FIG. 1 is a block diagram of an embodiment of a camera that has a communication link with an image processing station via a data cable in accordance with the invention.

Alternate embodiments of the invention may provide a system, software, and a method for controlling operating parameters of a digital video camera that is coupled with an image processing station via a communication link, although, of course, the invention is not thus limited in scope in this respect.

Briefly the invention determines when the requested video frame rate is larger than the frame rate permitted by the limited bandwidth of the link. If that is so, the invention may set the integration time in such a way that the resulting frame rate is in accordance with a maximum frame rate permitted by the link. The invention may thus optimize the Signal to Noise Ratio (SNR), which also optimizes image quality.

Referring to FIG. 1, an embodiment of a system according to the invention is now described. The system includes an article such as an image processing station 110. The image processing station 110 can comprise, for example, a special purpose device, or a general purpose device adapted for the special purpose. A general purpose device can include a computer, such as a personal computer, in which case the adaptation can be by software.

This particular embodiment can be used with an imager, such as digital video camera 120. Here, camera 120 takes pictures of a certain frame size (FS). The frame size is a function of the image size and the image depth. The image size is the total numbers of pixels. For example, camera 120 can have an image size of 640 pixels wide by 480 pixels high. The image depth is a term of art for describing how many bits are used to describe the value of the image data of each pixel. A typical number might be 16 bits per pixel. In this case, the frame size (FS) therefore equals 640×480× 16. Of course, any frame size may be employed in an alternative embodiment.

Camera 120 is coupled to image processing station 110 by a communication link 130, which is also known as a data guide or simply a pipe. In the case of FIG. 1, the communication link 130 comprises a cable, coupled to station 110 at a port 140. Port 140 can comprise a Universal Serial Bus (USB) port.

The communication link 130 can comprise any link, such as an infrared link, radio link, telephone line, Ethernet connection, or other data transfer link. In addition, the link 130 can include a number of concatenated legs. For example, data might even pass through a network, such as the Internet, before reaching station 110.

The article of the invention also has a storage medium, such as a computer readable storage medium, and a computing device, such as a processor or controller, that can interact with the storage medium. The storage medium has stored thereon instructions of a program that can be executed by the computing device. In the embodiment of FIG. 1, the image processing station 110 has a memory 150 and a Central Processing Unit (CPU) 160.

The detailed description that follows is presented largely in terms of display images, algorithms, and symbolic representations of operations of data bits within the computer readable medium. These algorithms descriptions and representations are the means used by those skilled in the data processing arts to most effectively convey the substance of their work to others skilled in the art. A person skilled in the art of programming can use this description to readily implement specific instructions for a program according to the present invention.

Often, for the sake of convenience only, it is preferred to implement and describe a program as various interconnected distinct software modules or features, also known as software. This is not necessary, however, and there may be cases where modules are equivalently aggregated into a single program with unclear boundaries.

In any event, the software modules or features of this embodiment can be implemented by themselves, or in combination with others. Again, the combination can result in distinct software modules, or ones with blurred boundaries.

An algorithm is here, and generally a self consistent sequence of steps leading to a desired result. These steps, also known as instructions, are those involving physical manipulations of physical quantities. Usually, though not necessarily, these quantities take the form of electrical or magnetic signals capable of being stored, transferred, combined, compared, and otherwise manipulated. When stored, they can be stored in any computer-readable medium. It is convenient at times, principally for reasons of common usage, to refer to these signals as bits, values, elements, symbols, characters, images, terms, numbers, or the like. It should be borne in mind, however, that all of these and similar terms are associated with the appropriate physical quantities and are merely convenient labels applied to these quantities.

In one embodiment, the method of the invention is implemented as machine operations optionally performed in conjunction with a human operator. Useful machines for implementing the method include general purpose digital computers, the image processing station 110, the camera 120, or other similar devices. There should be borne in mind the distinction between the method of operating a computer and the method of computation itself. This embodiment relates to method steps for operating a computer and processing electrical or other physical signals to generate other desired physical signals.

As described above, another aspect of the invention also relates to apparatus for performing these operations. This apparatus may be specially constructed for a specific purpose, or it may comprise a general purpose computer selectively activated or reconfigured by a computer program stored in the computer. The processes presented herein are not inherently related to any particular computer or other apparatus. In particular, various general purpose machines may be used with programs in accordance with the teachings herein, or it may prove more convenient to construct more specialized apparatus to perform the required method steps. The desired structure for a variety of these machines will appear from the description given below.

The program of the invention can be stored in a computer-readable medium, such as a computer memory, a microprocessor, etc. But it should be clear to a person skilled in the art that the program of this embodiment need not reside in a single memory, or even a single machine. Various portions, modules or features of it can reside in separate memories, or even separate machines. The separate machines may be linked directly, or through a network, such as a local access network (LAN), or a global network, such as what is presently known as Internet-1. Similarly, the users need not be collocated with each other, but each only with a machine that houses a portion of the program.

An adaptable station 110 can run such a program for any camera to which it is linked. The program outputs at least one operating parameter for driving the camera 120. Any event may trigger running the program, such as requesting a new frame rate. The request can be generated externally, or internally by the program. The request can be made any time. A new request can be looked for at any time, such as at video capture start, or when a reconnect is detected after a disconnect at a port 140 of station 110.

In the embodiment of FIG. 1, the program can include two components. The first component is an application software 170 called the camera client. The second component is a camera driver 180. Other components, also known as layers, may be interposed between the application software 170 and the camera driver 180.

The program of the invention includes software for computing a bandwidth constrained frame rate (BCFR) from a frame size (FS) of the video camera, and a bandwidth (BW) of the link. Computation may be according to Equation (1) below.

$$BCFR = BW/[FS \times CR] \qquad \text{Equation (1)}$$

where CR is the compression ratio. If there is no image compression, then CR may be set equal to one.

The program additionally includes software for determining whether the computed BCFR is smaller than a requested rate of video frames from the camera, and if so, for determining an integration time of pixels of the camera from the computed BCFR.

In one embodiment, the software for determining the integration time results in an integration time determined such that the camera outputs video frames at a rate commensurate with the computed bandwidth constrained frame rate. In other words, the integration time is computed such that the resulting video frame rate is the largest possible that the bandwidth of the link will permit. For example, if the BCFR is computed at 15 frames per second, then the integration time becomes $1/15^{th}$ sec.

It will be appreciated that making the actual video frame rate commensurate with the BCFR is accomplished by maximizing the integration time. This minimizes noise, which optimizes image quality.

In some instances, where the target scene is very bright, the integration time may not be brought as high as the computed BCFR dictates. In any event, the SNR is still low.

In one more embodiment, the software for computing the BCFR may use a compression ratio of the video camera.

In a specific embodiment, the software for determining an integration time computes a numerical inverse of the computed bandwidth constrained frame rate. The inverse may be used for determining an integration time threshold (ITT).

In an embodiment of the invention, the program further includes software for determining a gain of the camera from the determined integration time. The gain thus determined compensates for the adjusted integration time.

In some embodiments according to the invention, there may be predefined, associated values of integration time and gain, which may further correspond to luminance. They many be associated explicitly, such as by being stored in a memory as a look up table with indices. Or they may be associated implicitly and indirectly, as values that result as pairs from sets of instructions that search through successive steps.

In all these cases, the invention may operate by temporarily constraining the choices of the camera, while allowing it to operate regularly otherwise. For example, the invention may temporarily disable a portion of the table with integration times less than the determined integration time threshold (ITT). Or it can reject results from instructions that render too low integration times.

Given the above, the instructions stored on the medium, when executed by a computing device, result in computing a bandwidth constrained frame rate (BCFR) from the frame size of the video camera 120 and the bandwidth of the link 130. The instructions additionally determine whether the computed BCFR is smaller than a requested rate of video frames from the camera, and if so, further determine an integration time of pixels of the camera 120 from the computed BCFR.

In an embodiment, executing the instructions may additionally result in the determined integration time to be such that the camera outputs video frames at a rate commensurate with the bandwidth constrained frame rate.

Executing the instructions may also result in the bandwidth constrained frame rate to be computed also from a compression ratio of the video camera.

In an embodiment, executing the instructions may result in the computing a numerical inverse of the computed bandwidth constrained frame rate.

Executing the instructions may further result in determining a gain of the camera from the determined integration time.

Embodiments of methods for computing operating parameters in a digital video camera in accordance with the invention include the following. In these embodiments, the camera is linked with an image processing station by a communication link, which has limited bandwidth.

Referring now to FIG. 2, a representative method of the invention is described. References are made to components of this embodiment in accordance with the invention as they appear in FIG. 1. In addition, it will be appreciated that FIG. 2 can also serve as a flow chart of a software according to the invention.

According to box 210, a frame size FS of an imager such as the digital video camera 120 is set or determined. This can be by the camera client, either by inquiry or be a preprogrammed value.

According to box 220, a compression ratio CR of the digital video camera 120 is determined. This is performed if a compression feature is provided. The program generally knows in advance if the feature is provided, and if so, its value. Alternately, it can be determined by a query.

According to box 230, a bandwidth BW of the communication link 130 is determined. If the port 140 includes a USB type connection, then the bandwidth is known. The bandwidth could change, e.g. if the link were through the internet. In the latter case the bandwidth may be queried, and the program can adjust the frame rate dynamically.

According to box 240, a bandwidth constrained frame rate BCFR is computed from the determined bandwidth BW and frame size FS. Computation can be as taught in Equation (1). Although alternative approaches are also available, the computation can also include the compression rate CR, if a compression features is provided. If not, then CR is set equal to 1 in Equation (1) in this embodiment.

According to box 250, a requested frame rate is input. It can be requested by the camera client, at power up or other time. Or it can be input externally, at any time.

According to a box 260, it is determined whether the requested frame rate is larger than the bandwidth constrained frame rate BCFR. If not, then the request is honored. If it is larger, however, then an integration time of pixels of the camera is determined from the computed bandwidth constrained frame rate. In some embodiments, the integration time is determined with a value that results in the camera outputting video frames at a rate commensurate with the bandwidth constrained frame rate. In one of those embodiments, execution proceeds from box 260 to box 270.

According to box 270, an integration time threshold ITT is determined. It can be computed as a numerical inverse of the bandwidth constrained frame rate BCFR, although the invention is not limited in scope in this respect.

According to box 280, an integration time for the digital video camera 120 is set at a value at least as large as the determined integration time. It can be one of a set of preset acceptable values, or found by gradual adjustment.

According to an optional box 290, an updated gain value is determined from the determined integration time. This can be performed in a manner similar to what was described above. The operations of boxes 280 and 290 can take place concurrently.

The values can then be output to drive the camera 120.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

The specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

What is claimed is:

1. A method comprising:
   computing a bandwidth constrained frame rate from a frame size of an imager and a bandwidth of a link, where the bandwidth constrained frame rate is the rate at which frames may be transferred from the imager; and
   determining whether the computed bandwidth constrained frame rate is smaller than a frame rate requested from the imager, and if so, determining an integration time of pixels of the imager from the computed bandwidth constrained frame rate.

2. The method of claim 1, wherein the integration time is determined to result in the imager outputting video frames at a rate commensurate with the bandwidth constrained frame rate.

3. The method of claim 1, wherein the bandwidth constrained frame rate is computed also from a compression ratio of the imager.

4. The method of claim 1, wherein the integration time is determined also from a numerical inverse of the computed bandwidth constrained frame rate.

5. The method of claim 1, further comprising:
   determining a gain of the imager from the determined integration time.

6. An article comprising: a storage medium, the storage medium having stored thereon instructions, which, when executed by a computing device, result in:
   computing a bandwidth constrained frame rate from a frame size of a video camera and a bandwidth of a link, where the bandwidth constrained frame rate is the rate at which frames may be transferred from the imager; and
   determining whether the computed bandwidth constrained frame rate is smaller than a frame rate requested from the camera, and if so, determining an integration time of pixels of the camera from the computed bandwidth constrained frame rate.

7. The article of claim 6, wherein when the instructions are executed, the integration time is determined to result in the camera outputting video frames at a rate commensurate with the bandwidth constrained frame rate.

8. The article of claim 6, wherein when the instructions are executed, the bandwidth constrained frame rate is computed also from a compression ratio of the video camera.

9. The article of claim 6, wherein when the instructions are executed, further result in:

computing a numerical inverse of the computed bandwidth constrained frame rate.

10. The article of claim 6, wherein when the instructions are executed, further result in:

determining a gain of the camera from the determined integration time.

11. An image processing station for coupling to an imager by a communication link, the image processing station comprising: a computer readable storage medium containing a program for outputting through the link at least one operating parameter of the imager, the program comprising software for computing a bandwidth constrained frame rate from a frame size of the imager and a bandwidth of the link, where the bandwidth constrained frame rate is the rate at which frames may be transferred from the imager; and software for determining whether the computed bandwidth constrained frame rate is smaller than a frame rate requested from the imager, and if so, for determining an integration time of pixels of the imager from the computed bandwidth constrained frame rate.

12. The image processing station of claim 11, wherein the software for determining the integration time determines an integration time to result in the imager outputting video frames at a rate commensurate with the computed bandwidth constrained frame rate.

13. The image processing station of claim 11, wherein the software for computing the bandwidth constrained frame rate also uses a compression ratio of the video imager.

14. The image processing station of claim 11, wherein the software for determining an integration time computes a numerical inverse of the computed bandwidth constrained frame rate.

15. The image processing station of claim 14, wherein the program further comprises:

software for determining a gain of the imager from the determined integration time.

* * * * *

UNITED STATES PATENT AND TRADEMARK OFFICE
CERTIFICATE OF CORRECTION

| | | |
|---|---|---|
| PATENT NO. | : 6,882,361 B1 | Page 1 of 1 |
| APPLICATION NO. | : 09/552997 | |
| DATED | : April 19, 2005 | |
| INVENTOR(S) | : Gaylord | |

It is certified that error appears in the above-identified patent and that said Letters Patent is hereby corrected as shown below:

On the title page item (73) should read --Intel Corporation--

Signed and Sealed this
Twelfth Day of January, 2016

Michelle K. Lee
*Director of the United States Patent and Trademark Office*